Dec. 17, 1929. I. J. A. HAGEMO 1,740,172
SAVINGS BANK AND TOY
Filed June 21, 1926 9 Sheets-Sheet 1

Inventor
Ingwald J.A. Hagemo
By his Attorneys

Dec. 17, 1929.     I. J. A. HAGEMO     1,740,172
SAVINGS BANK AND TOY
Filed June 21, 1926     9 Sheets-Sheet 2
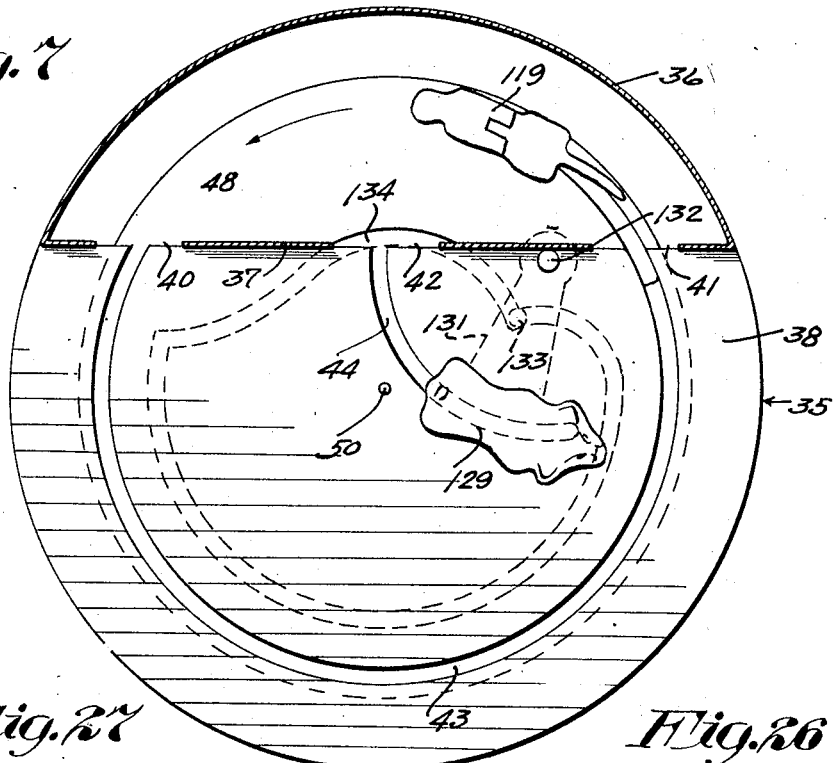
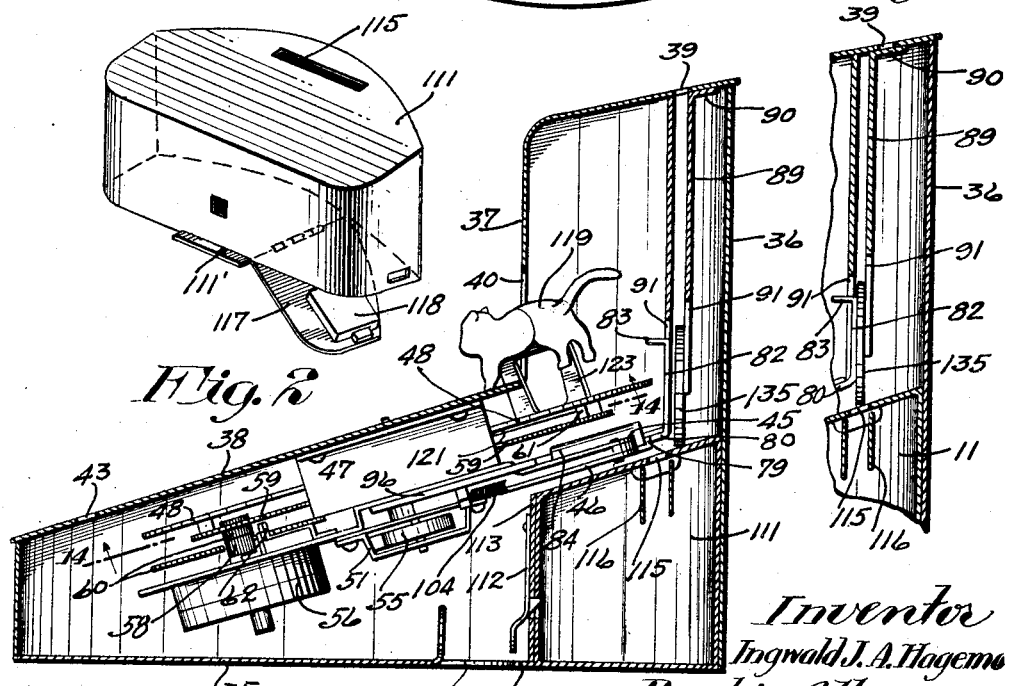

Dec. 17, 1929.  I. J. A. HAGEMO  1,740,172
SAVINGS BANK AND TOY
Filed June 21, 1926  9 Sheets-Sheet 3
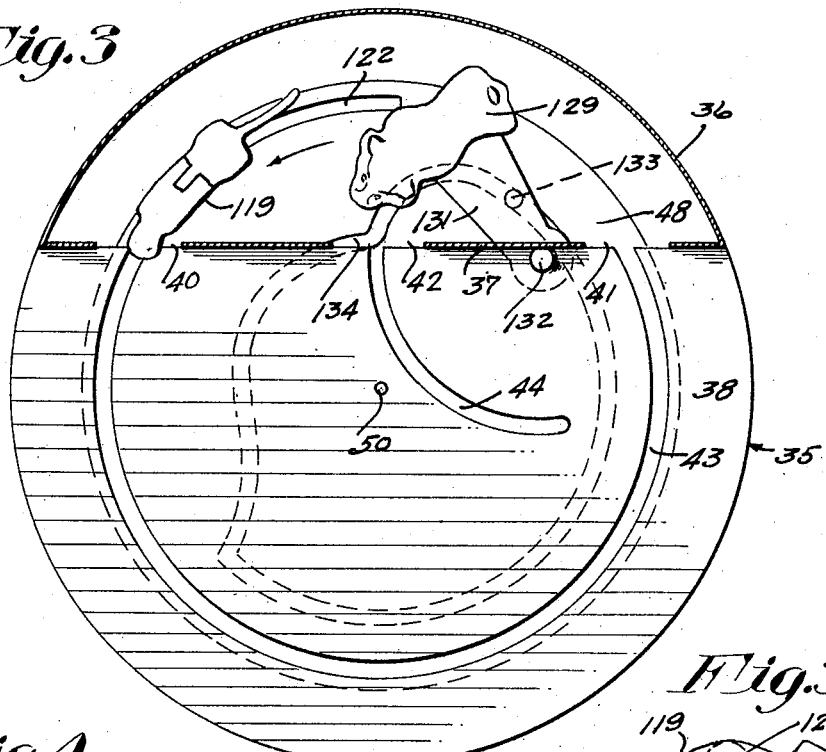
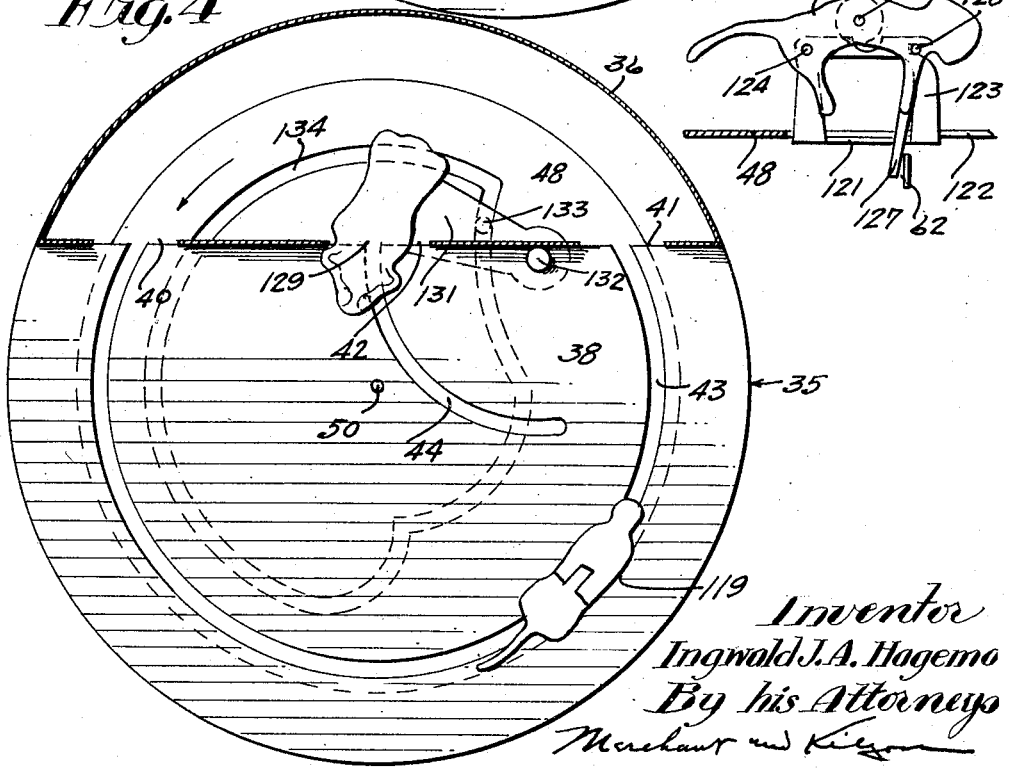
Inventor
Ingwald J. A. Hagemo
By his Attorneys Dec. 17, 1929.  I. J. A. HAGEMO  1,740,172
SAVINGS BANK AND TOY
Filed June 21, 1926  9 Sheets-Sheet 4

Inventor
Ingwald J. A. Hagemo
By his Attorneys

Dec. 17, 1929.  I. J. A. HAGEMO  1,740,172
SAVINGS BANK AND TOY
Filed June 21, 1926  9 Sheets-Sheet 5
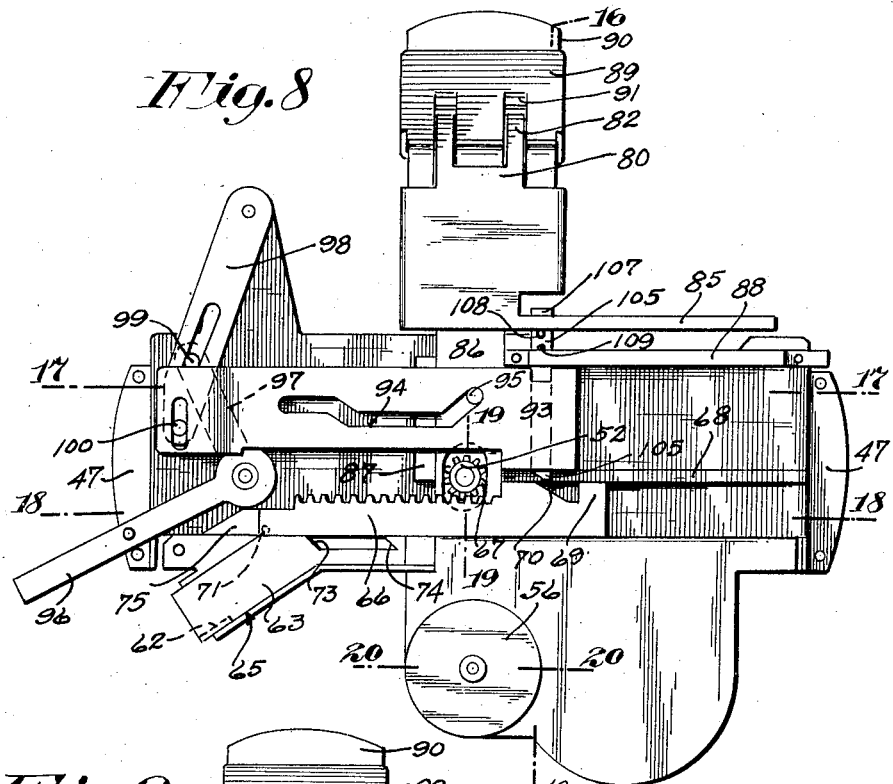
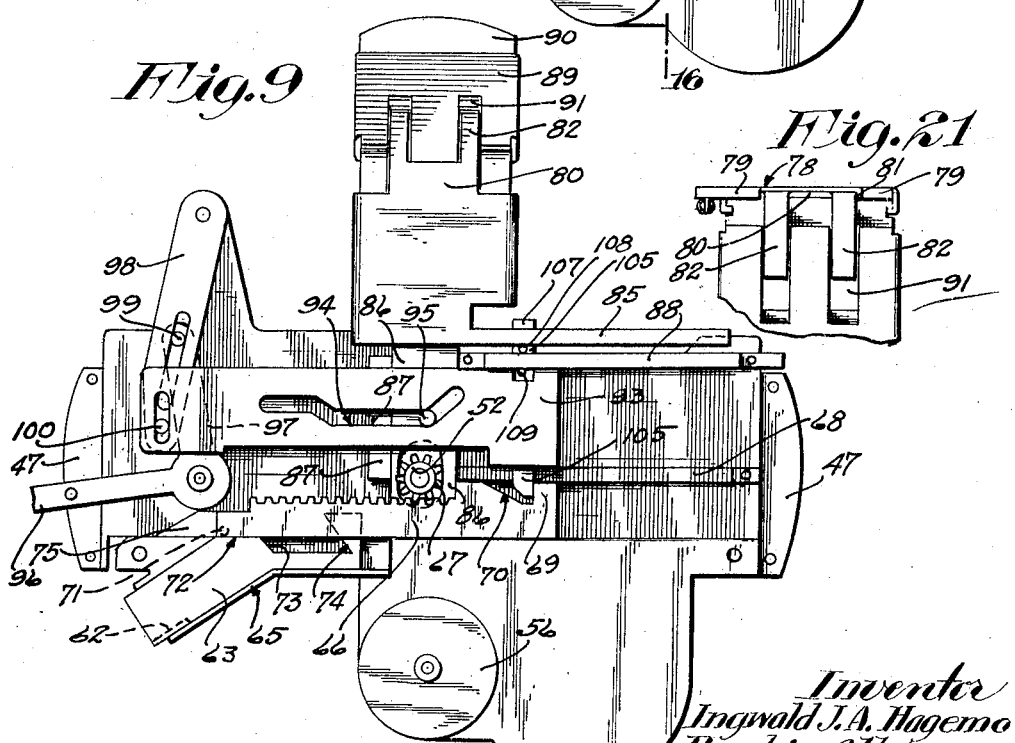
Inventor
Ingwald J. A. Hagemo
By his Attorneys
Merchant and Keegan Dec. 17, 1929.  I. J. A. HAGEMO  1,740,172
SAVINGS BANK AND TOY
Filed June 21, 1926  9 Sheets-Sheet 6

Inventor
Ingwald J. A. Hagemo
By his Attorneys
Merchant & Regan

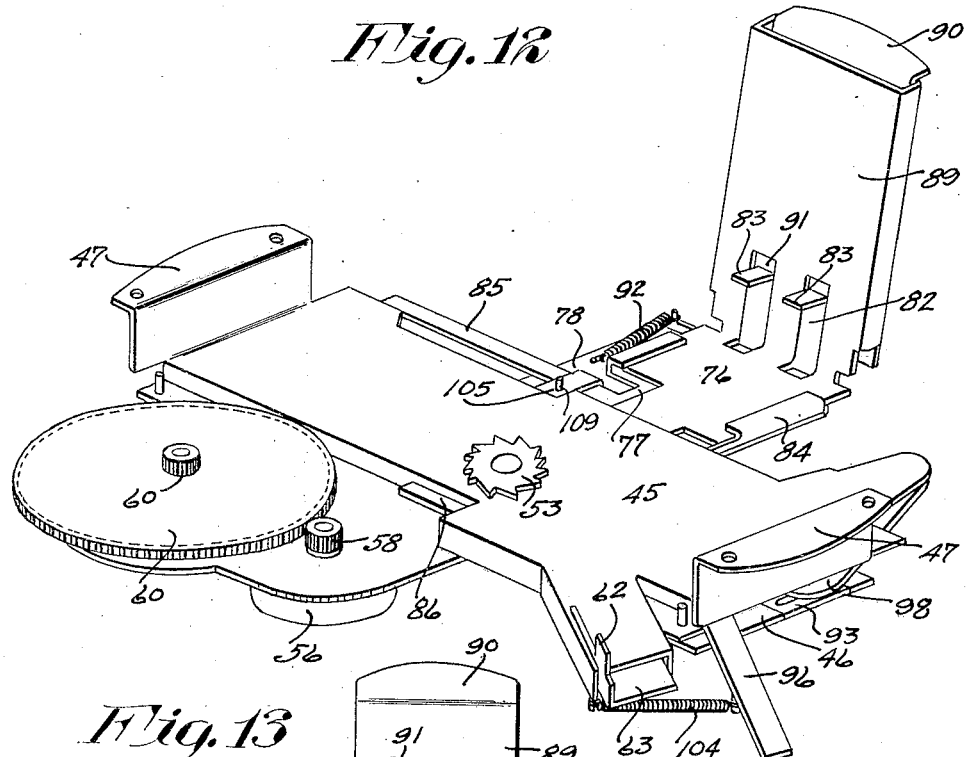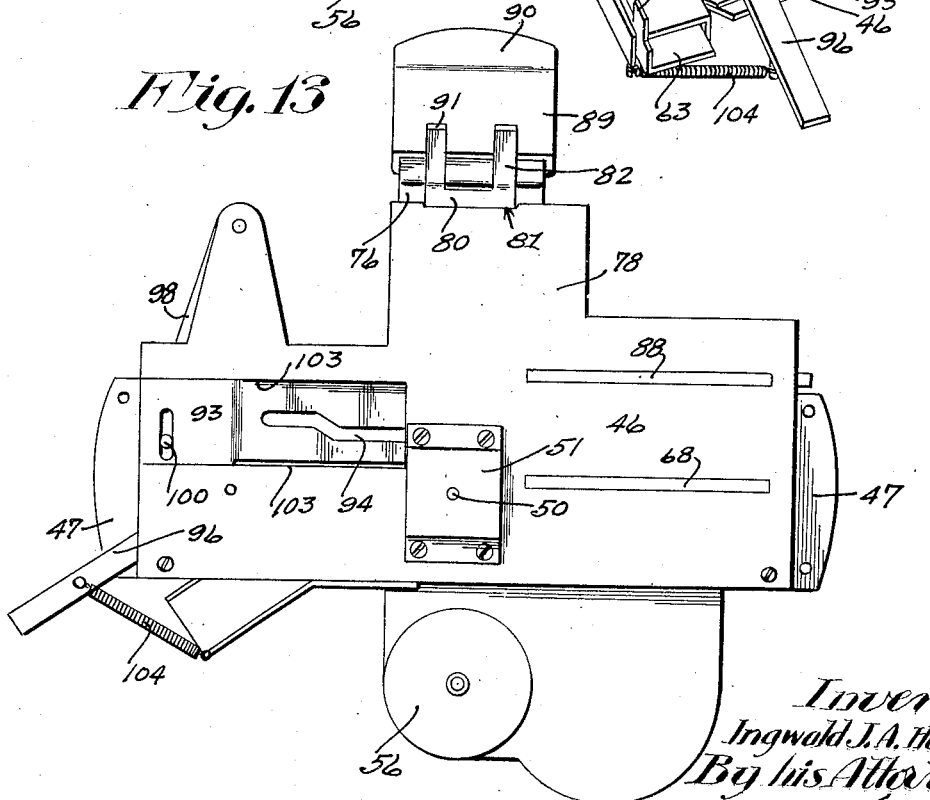

Dec. 17, 1929.  I. J. A. HAGEMO  1,740,172
SAVINGS BANK AND TOY
Filed June 21, 1926  9 Sheets-Sheet 8

Inventor
Ingwald J. A. Hagemo
By his Attorneys

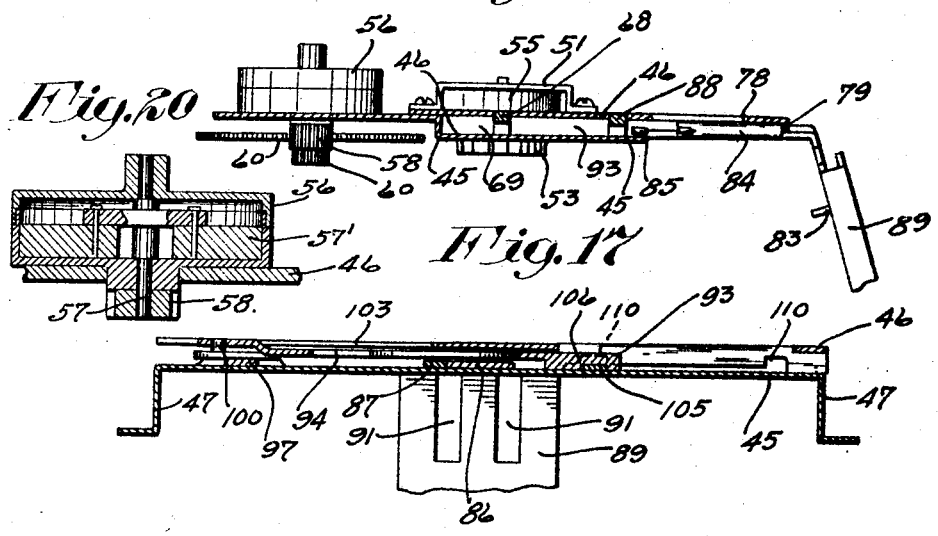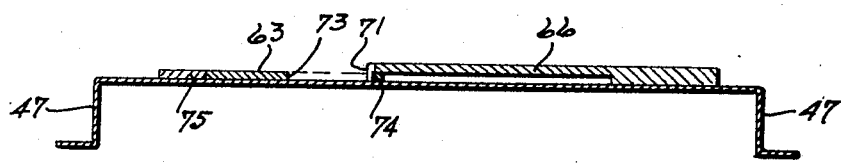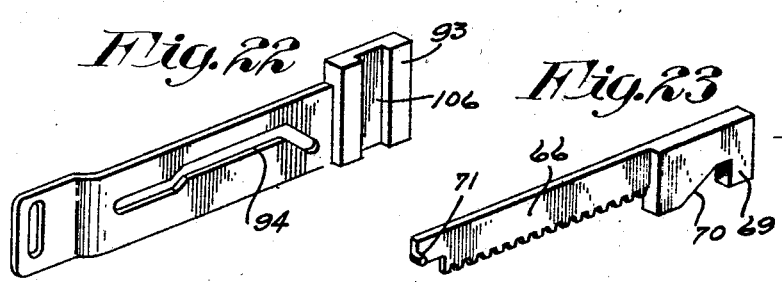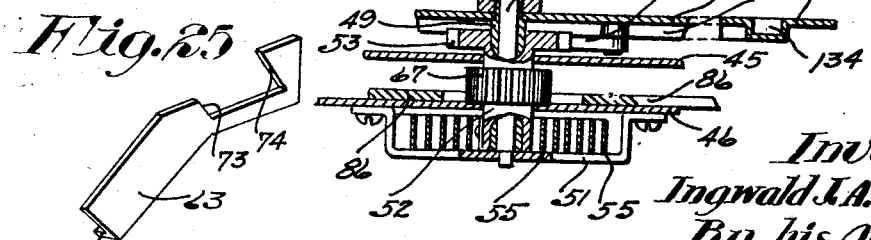

Patented Dec. 17, 1929

1,740,172

UNITED STATES PATENT OFFICE

INGVALD J. A. HAGEMO, OF MINNEAPOLIS, MINNESOTA, ASSIGNOR, BY MESNE ASSIGNMENTS, TO J. E. RIDENOUR, OF WATERLOO, IOWA

SAVINGS BANK AND TOY

Application filed June 21, 1926. Serial No. 117,384.

My present invention has for its object to provide a child's savings bank and a toy arranged to be operated by mechanism controlled by a coin as it is being deposited in the savings bank.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 2 is a view principally in central vertical section taken on the irregular line 2—2 of Fig. 1;

Figure 1:
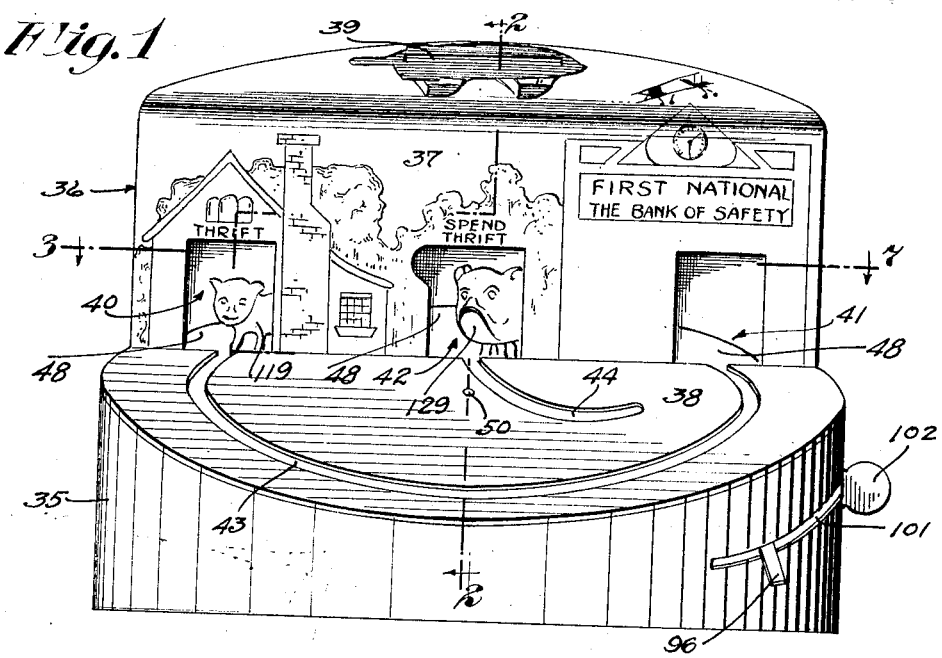
Fig. 1 is a front elevation of the invention.
Figure 28:
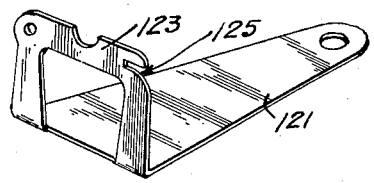
Figure 29:
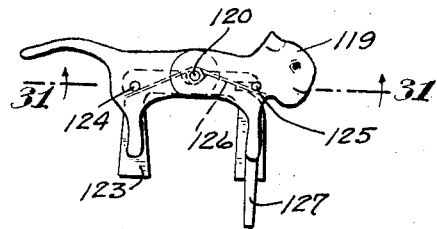
Figure 31:
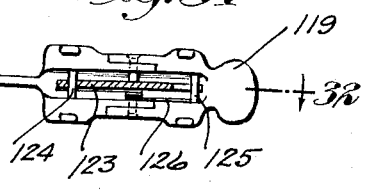
Figure 32:
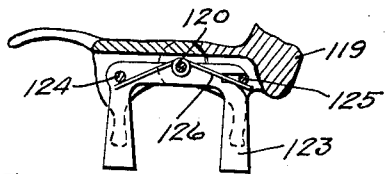
Figure 33:
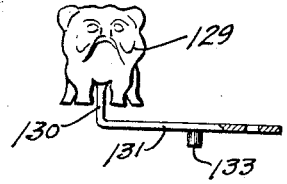
Figure 5:
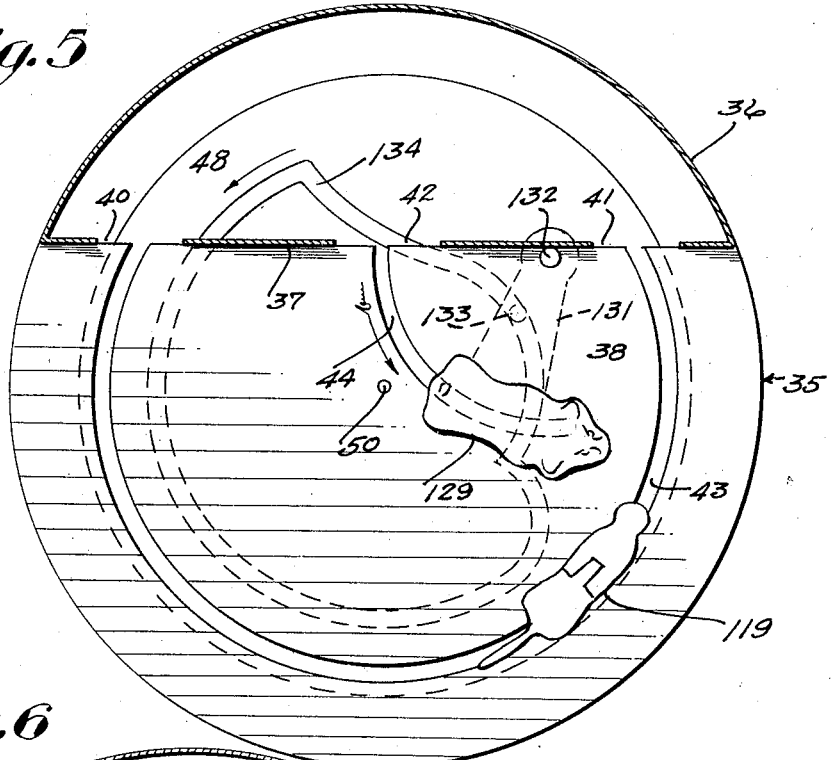
Figure 15:
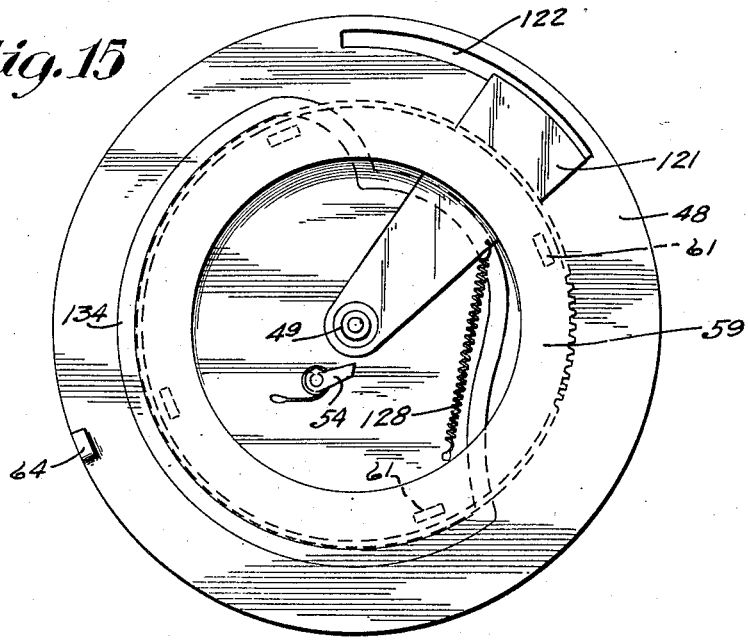
Figure 14:
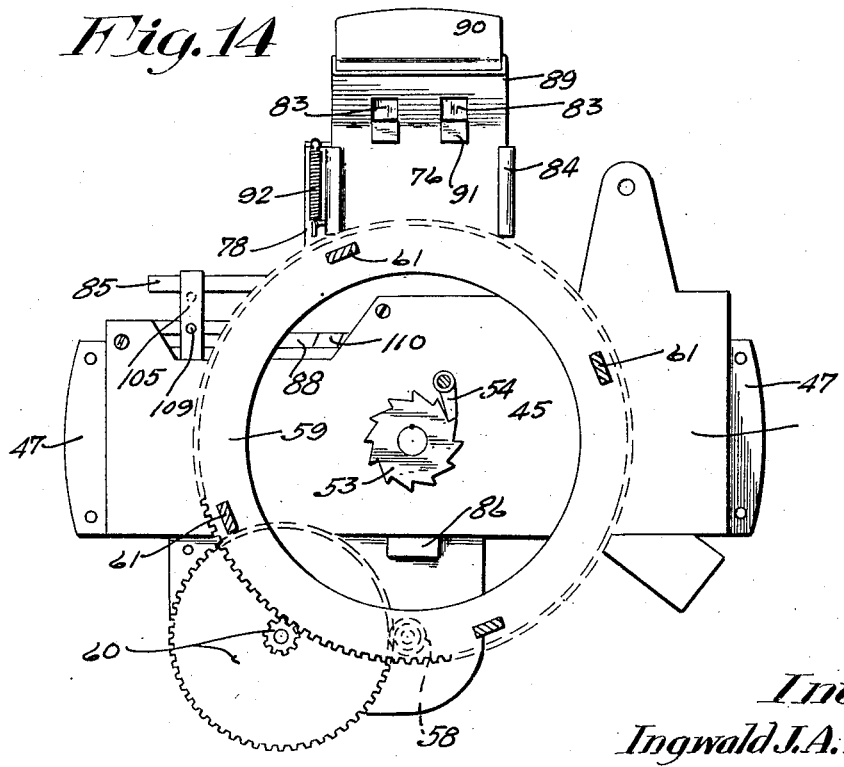

Figs. 3 to 7, inclusive, are views partly in plan and partly in horizontal section taken on the line 3—7 of Fig. 1, showing different positions of the turn table and figures;

Figs. 8, 9, 10 and 11 are bottom plan views with the bottom plate removed and illustrating different positions of the coin-controlled mechanism;

Fig. 12 is a perspective view of the coin-controlled mechanism removed from the casing;

Fig. 13 is a bottom plan view of the same;

Fig. 14 is a view partly in bottom plan and partly in section taken on the line 14—14 of Fig. 2;

Fig. 15 is a bottom plan view of the turn table;

Fig. 16 is a view partly in side elevation and partly in section taken on the line 16—16 of Fig. 8;

Fig. 17 is a view principally in section taken on the line 17—17 of Fig. 8;

Fig. 18 is a detail view in section taken on the line 18—18 of Fig. 8;

Fig. 19 is a fragmentary detail view principally in section taken on the line 19—19 of Fig. 8 on an enlarged scale;

Fig. 20 is a detail view principally in section taken on the line 20—20 of Fig. 8, on an enlarged scale;

Fig. 21 is a fragmentary view in rear elevation of the bottom portion of the money chute inverted;

Fig. 22 is a perspective view of the cam bar;

Fig. 23 is a perspective view of the rack;

Fig. 24 is a perspective view of the latch bar;

Fig. 25 is a perspective view of the stop-equipped slot;

Fig. 26 is a fragmentary detail view of the head in section with the money chute moved into a different position from that shown in Fig. 2;

Fig. 27 is a perspective view of the coin box with the door open;

Fig. 28 is a perspective view of the cat mounting arm;

Fig. 29 is a side elevation of the cat and its mounting arm;

Fig. 30 is a view corresponding to Fig. 29 but showing the cat in a different position and also showing in section a portion of the turn-table and its stop;

Fig. 31 is a view partly in bottom plan and partly in section taken on the line 31—31 of Fig. 29;

Fig. 32 is a view partly in elevation and partly in longitudinal central section taken on the line 32—32 of Fig. 31; and Fig. 33 is a view partly in elevation and partly in section showing the bull dog and its mounting arm.

The numeral 35 indicates an upright cylindrical casing, the rear end portion of which is upwardly extended to afford a segmental housing 36, the front flat wall of which is indicated by the numeral 37. The top of the casing 35, forward of the wall 37, is inclined to afford a platform 38. The top of the housing 36 is slightly inclined and has formed therein a money slot 39. The wall 37 is lithographed or otherwise decorated to indicate a dwelling having a door opening 40, a bank building having a door opening 41, and a kennel having a door opening 42 located midway between said door openings 40 and 41. The word "Thrift" appears above the door opening 40 and the words "First National the bank of safety" appear over the door opening 41 and the words "Spend thrift" appear over the door opening 42.

On the top of the housing 36 is indicated a dirigible and an airplane, the former of which is arranged around the money slot 39 in said top to make the same less conspicuous. Formed in the platform 38, concentric with the casing 35, is a segmental slot 43 which leads from the door opening 40 and enters the door opening 42. Also formed in the platform 38 is a segmental slot 44 that extends from the door opening 42 toward the door opening 41 but terminates short of the slot 43.

Extending transversely in the casing 35 at the center thereof are top and bottom bearing plates 45 and 46, respectively, rigidly connected and vertically spaced by screws. On the ends of the top plate 45 are brackets 47 rigidly secured to the under side of the platform 38 by screws and hold said plate and the bottom plate 46 suspended therebelow. A turntable 48 is mounted in the casing 35 above the top plate 45 and provided with a depending axially positioned hollow trunnion 49 journaled on a shaft 50, the upper end of which is journaled in the platform 38 and the lower end of which is journaled in a wide U-shaped housing plate 51, the arms of which are secured by screws to the under side of the bottom plate 46. Said hollow trunnion 49 in turn is journaled in a short tubular shaft 52 journaled in the top plate 45 and the bottom plate 46 and supported on the housing plate 51. The turntable 48 is connected to the upper end of the tubular shaft 52 by a ratchet wheel 53 on said shaft and a co-operating spring-pressed one-way pawl 54 pivoted to the under side of said turntable. The ratchet wheel 53 and pawl 54 are arranged to cause the tubular shaft 52 to rotate the turntable 48 in the direction of the arrow marked thereon in Fig. 3 and to permit said hollow shaft to be reversely rotated while the turntable is standing still for a purpose that will presently appear.

A spring motor 55 is provided for rotating the turntable 48 in the direction of the arrow marked thereon in Fig. 3 and which motor is mounted between the bottom plate 46 and the housing plate 51. The hollow shaft 52 extends axially through the spring of the motor 55 with one end of said spring attached to said shaft and the other end thereof anchored to said housing plate. The speed at which the turntable 48 is rotated by the motor 55 is controlled by a centrifugal governor comprising a cylindrical housing 56, a shaft 57, journaled in said housing at the axis thereof, and having a radially extended head to which radially movable brake shoes 57' are loosely pivoted and arranged to engage the internal wall of said housing as a braking surface.

The governor housing 56 is secured to the under side of the bottom plate 46 with its shaft 57 extending upward through the same and having a pinion 58 secured thereto. The pinion 58 is driven from the turntable 48 by a large ring gear 59 and connected intermediate pinion and gear 60. The ring gear 59 is axially aligned with the turntable 48 and rigidly suspended therefrom by a plurality of circumferentially spaced short arms 61.

The turntable 48 is stopped at the completion of each rotation by a movable upstanding stop lug 62 on a slide 63 arranged to engage a fixed stop shoulder 64 on the under side of said turntable at the perimeter thereof. This slide 63 is mounted in a guide 65 between the plates 45 and 46 for radial movement in respect to the turntable 47.

The motor 55 is wound, while the turntable 48 is held against rotation, by the stop 62, by a rack 66 and co-operating pinion 67 on the upper end of the tubular shaft 52. The rack 66 is supported on the plate 46 for reciprocating movement from one side of the casing 35 to the other and is held for straight line movement by a channel formed in part by the top plate 45 and a longitudinally extended rail 68 secured to said top plate. Formed with one end of the rack 66 is a lock detent 69 and a cam shoulder 70 longitudinally spaced therefrom, and on the other end of said rack is a laterally projecting lock lug 71 that normally overlies a shoulder 72 on the inner end portion of the slide 63 when said rack is retracted and holds said slide projected with its stop lug 62 in the path of movement of the stop shoulder 64 on the turntable 48.

Formed on the inner end portion of the slide 63 are inner and outer cam shoulders 73 and 74, respectively, that extend obliquely and transversely in respect to the direction of movement of the slide 63. During the final projecting movement of the rack 66 to wind the motor 55 the lock lug 71 engages the cam shoulder 74, retracts the slide 63 and moves its stop lug 62 out of engagement with the stop shoulder 64 and thereby releases the turntable 48 to be rotated by the motor 55.

As the motor 55 rotates the turntable 48 its pinion 67 projects the rack 66 and causes its lock lug 71 to engage the cam shoulder 73 and project the slide 63 to again position its stop lug 62 in the path of movement of the stop shoulder 64 to stop the turntable 48 at the completion of its rotation. During the projecting movement of the rack 66 its lock lug 71 moves out of engagement with the cam shoulder 73 at the completion of the projecting movement of the slide 63 and over the shoulder 72 to lock said slide projected. A stop 75 on the upper plate 45 limits the retracting movement of the rack 66 and prevents further unwinding of the spring motor 55.

Manually operated connections for winding the motor 55 are provided to project the rack 66 and include upper and lower slides 76 and 77 mounted for reciprocating movement from the front to the rear of the casing 35 at the rear of the plates 45 and 46 and at right angles to the movement of the rack 66. The lower slide 77 is slidably mounted directly on a rear extension 78 of the bottom plate 46 and has at its rear end an upturned stop flange 79 that limits the rearward movement of said slide. Said lower slide 77 is provided with a short rearwardly projecting relatively narrow extension 80 that works through a passageway 81 formed in the stop flange 79 and is guided thereby for straight line movement. On the rear end of the extension 80 is a pair of upright coin-clamping fingers 82 that have laterally and forwardly extended ends 83. The lower slide 77 has on its longitudinal edges channel flanges 84 with which the upper slide 76 is slidably mounted. On the rear end portion of the lower slide 77 is a long laterally projecting latch-actuating bar 85 and on the rear end of the upper slide 76 is a relatively narrow long forward extension 86 that projects between the plates 45 and 46 and has a longitudinal slot through which the pinion 67 loosely projects with freedom to permit free movement of said upper slide. The forward extension 86 of the upper slide 76 is held for straight line movement and against edgewise movement by a guide bar 87 on the top plate 45 and the rear ends of the guide rail 68 and a corresponding laterally spaced guide rail 88 that extends parallel thereto and secured to said top plate. It may be here stated that the intermediate portions of the rails 68 and 88 are spaced below the top plate 45.

On the rear end of the upper slide 76 is an upstanding coin chute 89, the upper end of which has the same inclination as the top of the housing 36 and is closely positioned thereto. Normally this coin chute 89 is in registration with the coin slot 39, as shown in Fig. 2. On the rear wall of the coin slot 39, at the top thereof, is a laterally projecting lip 90 arranged to close the money slot 39 when the money chute 89 is moved out of registration therewith.

Formed in the front and rear walls of the lower end portion of the coin chute 89 is a pair of passageways 91 through which the coin-clamped fingers 82 are free to move during the movement of the upper slide 76 on the lower slide 77. A coiled spring 92 has one of its ends anchored to the lower plate extension 78 and its other end to the lower slide 77, and normally holds said slide against the stop flange 79, as best shown in Fig. 2.

A cam bar 93 is mounted between the plates 45 and 46 for endwise sliding movement under the forward extension 86 of the upper slide 76 for parallel movement to the rack 66. A longitudinal cam slot 94 is formed in the cam bar 93, and a cam stud 95 on the extension 78 on the upper slide 86 extends into said cam slot. The cam bar 93 is reciprocated by a hand lever 96 pivoted to and between the plates 45 and 46 and has at its pivoted end a crank extension 97 connected to the intermediate portion of a swinging link 98 by a slot and pin connection 99. One end of the link 98 is pivoted to the plates 45 and 46 and its other end is connected to the respective end of the cam bar 93 by a slot and pin connection 100. The lever 96 extends outward of the casing 35 through a circumferential slot 101 formed in the right side thereof.

A fixed finger piece 102 is secured to the casing 35 at the rear of its slot 101. The end portion of the cam bar 93 to which the link 98 is connected is downwardly offset, works in a slot 103 in the lower plate 46, and is guided thereby, and the other end or head of said bar works between the rails 68 and 88 and is guided thereby. A coiled spring 104 anchored to the lower plate 46 and attached to the lever 96 normally and yieldingly holds said lever with the cam bar 93 stopped by the engagement of the cam stud 95 in one end of the cam slot 94, as shown in Fig. 8.

A latch bar 105 is mounted in a channel 106 that extends transversely across the upper face of the head of the cam bar 93 and is held in said channel by the top plate 45. This latch bar 105 extends transversely under the rails 68 and 88 and has a lug 107 and a pin 108 that engage the opposite longitudinal edges of the latch-actuating bar 85 and connect said bar 85 thereto against endwise movement but with freedom for sliding movement longitudinally thereon. Normally the latch bar 105 is out of engagement with the rack 66 but is positioned to be projected back of its lock detent 69. Extending from opposite sides of the latch bar 105 is a pin 109 arranged to engage and travel along either of the longitudinal edges of the rail 88. A pair of longitudinally spaced passageways 110 are formed in the under side of the rail 88 for the passage of the pin 109 from one side of said rail to the other at the limit of the two extreme edgewise movements of the latch bar 105 by the cam bar 93.

A coin box 111 is inserted into the casing 35 through an opening in the bottom thereof and is releasably held in place by a spring latch 112 on a partition 113 in said casing. This partition and the wall of the casing 35 hold the coin box 111 against lateral movement in said casing. In the bottom of the casing 35 is a finger hole 114 through which the latch 112 may be engaged to release the same. In the top of the coin box 111 is a coin slot 115 with which the coin chute 89 registers when moved into a position as shown in Fig. 26. A pair of laterally spaced guard plates 116 in the coin box 111 on opposite sides of its coin slot 115 prevent coins in said box from being removed therefrom. In the bottom of the coin box 11 is an opening through which the coins may be removed, and which opening is normally closed by a hinged door 117 held closed by a key-actuated lock 118. A stop lip 111' on the front of the coin box 111 at the bottom thereof engages the lower edge of the partition 113 as a stop to limit the movement of the coin box into the casing 35.

The channel 43, which is concentric with the axis of the turntable 48, may be designated as the "Road to prosperity and happiness," leads from the house of Thrift to the Bank. Normally, within the housing 36 at the door opening 40 is a wise cat 119, the front and rear halves of which are connected by a hinged joint 120, so arranged so as to cause the cat to hump her back, as will presently appear. This cat 119 is carried by a wide flat radially extended arm 121, the inner end of which is pivoted to the tubular shaft 52 for swinging movement thereabout. The outer end of the arm 121 is extended upward at right angles to said arm and is projected through a segmental slot 122 in the turntable 48, at the perimeter thereof, and the slot 43 in the platform 38 to afford a support 123 for the cat 119. Said slot 122 and the slot 43 have the same radius so that they are in registration, the one with the other. This cat support 123 extends into a longitudinal slot cut in the under side of the cat and the rear half of said cat is attached thereto by a transverse pivot pin 124. The front half of the cat 119 is connected to the cat support 123 by a notch and pin connection 125 that permits the humping action of the cat. A spring 126 intermediately coiled about the pivot pin 120 has its end portions extended under the pivot pins 124–125 and normally holds the cat in its natural position. On one of the front legs of the cat 119 is a depending trip finger 127 that extends through the slots 43 and 122 to engage the stop 62. It will first be seen that the cat support 123 holds the cat 119 for travelling movement over the slot 43. A coiled spring 128 anchored to the turntable 48 and attached to the arm 121 yieldingly holds said arm with the cat support 123 engaging the turntable 48 at the front end of the slot 122, and thus causes the cat 119 to travel with the turntable 48.

Normally within the housing 36 at the door opening 42 is a bulldog 129 mounted on a dog support 130 formed on the outer end of a swinging arm 131 pivoted at 132, which is the axis of the slot 44, with said dog support arranged to travel in the slot 44. On the under side of the arm 131 is a depending cam stud 133 arranged to travel in an endless cam channel 134 pressed in the upper face of the turntable 48.

It may be here stated that by dropping a coin 135 in the slot 39 the same is precipitated through the coin chute 89 and supported edgewise on the inclined top of the coin box 111. With the coin 135 thus positioned, the connection between the upper and lower slides 76 and 77 is completed so that the mechanism may be operated to wind the motor 55 by a movement of the lever 96 towards the finger piece 102. Before a coin is dropped into the coin chute 89 a movement of the lever 96 will simply cause the cam bar 93 to reciprocate the upper slide 76 without moving the lower slide 77 to connect the cam bar 93 to the rack 66 by the latch bar 105.

The operation of the toy produced by the deposit of a coin in the coin box 111 may be briefly described as follows:

A coin, which may vary in dimensions from one cent to fifty cents, is deposited in the coin slot 39 and is precipitated through the coin chute 89 and stopped by the top of the coin box 11, as shown in Fig. 2. The depositor of the coin then takes hold of the lever 96 and finger piece 102 and presses said lever toward said finger piece. This action of the lever 96 by the connections 98 and 97 projects the cam bar 93 and thereby causes the cam stud 95 to travel in the cam slot 94. The initial movement of the cam stud 95 in the cam slot 94 causes a forward movement of the coin chute 89, thus clamping the coin 135 between the back wall of said chute and the coin-clamping fingers 82. This movement of the coin chute 89 carries the coin 135 forward so that the same is aligned with the underlying coin slot 115 in the coin box 111. It also carries the lip 90 forward into a position to close the coin slot 39.

At the time the coin-clamping fingers 82 are engaged by the coin 135 the bottom slide 77 is moved forward and thereby projects the latch bar 105, which is being moved edgewise with the cam bar 93, back of the detent 69. During the retracting movement of the latch bar 105 by the latch-actuating bar 85 the pin 109 is moved through the adjacent passageways 110 and then moved along the front edge of the rail 88, during the retracting movement of the cam bar 93, and thus locks the latch bar 105 engaged with the detent 69. Further movement of the cam bar 93 causes its cam slot 94 to hold the connected slides 76 and 77 against further movement and also causes the latch bar 105 to move the rack 66 with the cam bar 93 to operate the pinion 67 to wind the motor 55. During the winding of the motor 55 up to this time the turntable 48 has been held by the stop lug 62 against rotation and the pawl 54 has been slipping over the ratchet wheel 53. The initial movement of the rack 66 has carried the lock lug 71 out of engagement with the shoulder 72 and it is positioned between the cam shoulders 73 and 74.

Still further retracting movement of the cam bar 93 causes its cam slot 94 to move the cam stud 95 and thereby move the upper slide 76 rearward to release the held coin 135. During this movement of the upper slide 76 the lower slide 77 is held stationary by the latch bar 105 which in turn is held against endwise movement by the engagement of its pin 109 with the front longitudinal edge of the rail 88. During the final retracting movement of the rack 66 during the winding of the motor 55 the cam lock 71 engages the cam shoulder 74 and retracts the slide 63 and thus moves the lug 62 out of the path of movement of the stop shoulder 64, thus releasing the turntable 48. During the completion of the retracting movement of the cam bar 93 the pin 109 is brought into registration with the respective passageway 110 and the cam shoulder 70 engages the latch bar 105 and moves the same out of engagement with the detent 69. With the pin 109 thus released from the rail 88 the spring 92, which has been held under tension by the lower slide 77 in its forward position, becomes active and returns said slide to its normal position, which, in turn, completes the retracting movement of the latch bar 105 by its latch-actuating bar 85. Upon the release of the lever 96, at the completion of the projecting movement of the cam bar 93 to wind the motor 55, the spring 104 returns said lever to its normal position which in turn retracts the cam bar 93 and this action of the cam resets the upper slide 76 under the action of the cam slot 94 and the cam stud 95. At the time the latch bar 105 is moved out of engagement with the detent 69 the rack 66 is released and the motor 55 becomes active to rotate the turntable 48.

During the unwinding of the motor 55 its pinion 67 retracts the rack 66 and during this retracting movement of said rack its lock lug 71 engages the cam shoulder 73 and projects the slide 63 to reposition the stop lug 62 in the path of movement of the stop shoulder 64 on the turntable 48. At the completion of the retracting movement of the rack 66 its lock lug 71 again moves over the shoulder 72 and locks the slide 63 projected. The engagement of the rack 66 with the stop 75 stops the unwinding action of the motor, at which time the turntable 48 has made one complete rotation and is again stopped by the engagement of its stop shoulder 64 with the stop lug 62.

Figure 6:
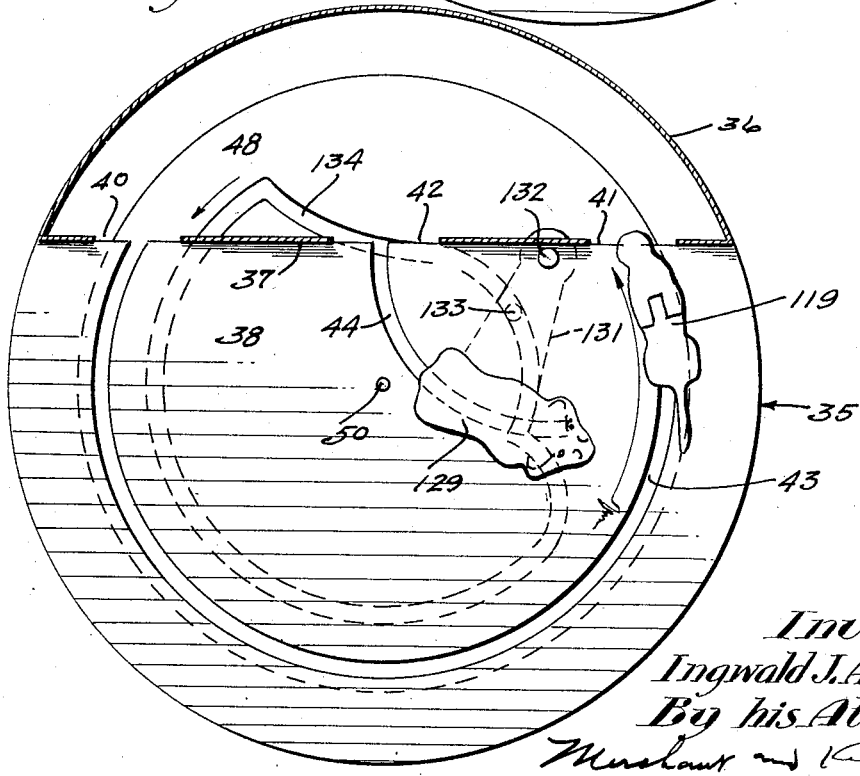
Figure 10:
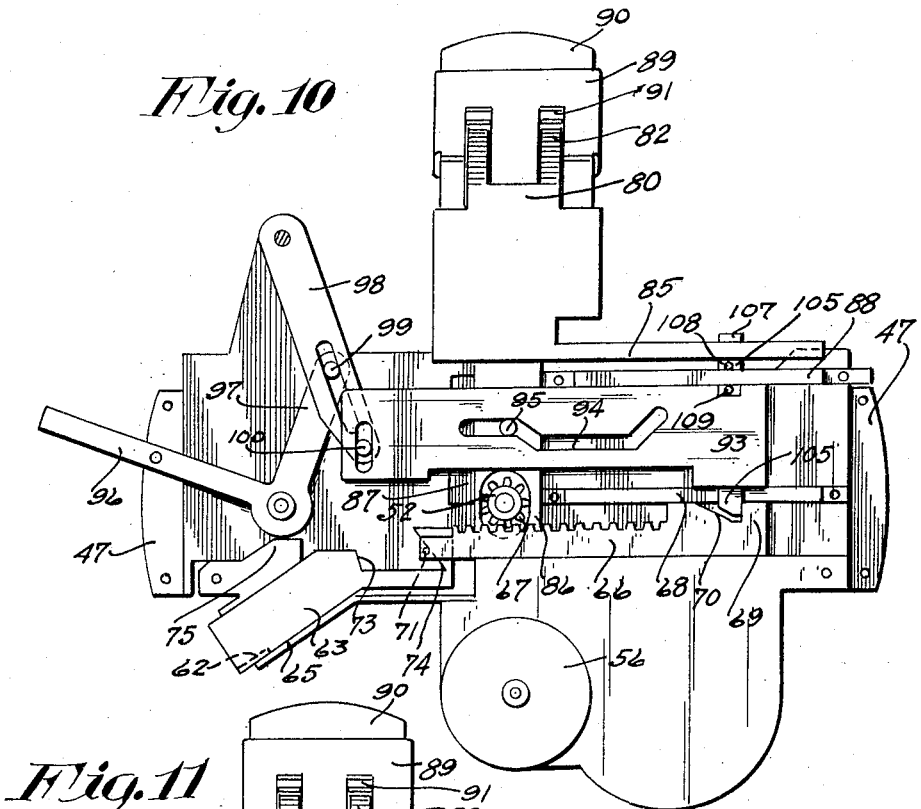
Figure 11:
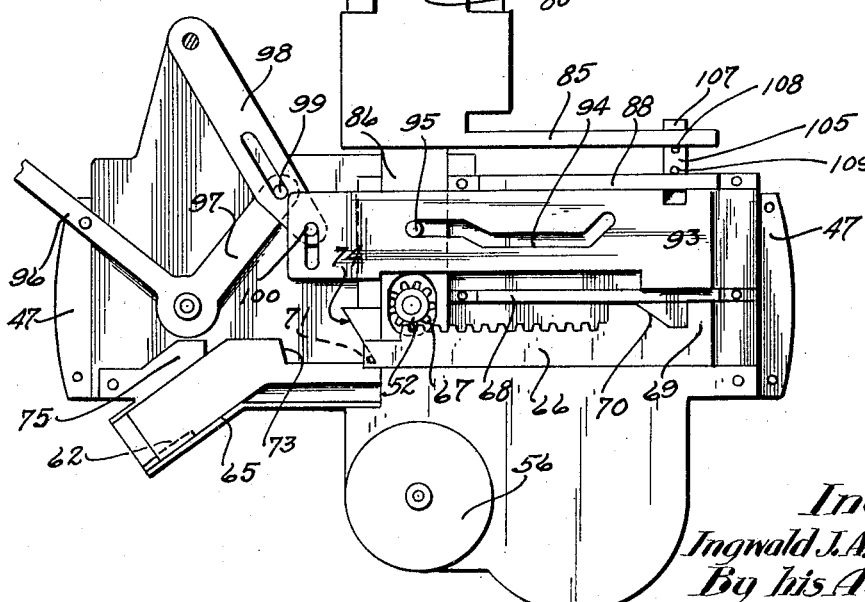

During the winding of the motor 55 the cat 119 and dog 129 are stationary in the housing 36, as shown in Fig. 3. At the completion of the winding of the motor 55 and the release of the turntable 48 the cat 119 is carried over the platform 38 by said turntable a distance of substantially 180°, as shown in Fig. 4. In this position of the cat 119 the cam channel 134, acting on the cam stud 133, moves the dog 129 through the door opening 42 and over the platform 38 toward the cat 119. Upon the approach of the dog 129 toward the cat 119 the slide 63 is projected by the rack 66, and its stop lug 62 is moving transversely into the path of movement of the tripping finger 127 on the cat 119. When the tripping finger 127 engages the stop lug 62 further movement of the front half of the cat 119 is stopped, thereby causing said cat to hump her back, as shown in Fig. 30, and then stand still in this position. While the cat 119 is standing still the turntable continues to rotate, due to the slot 122 in which the cat support 123 projects, and places the spring 128 under tension. By the time the turntable 48 has moved substantially the length of the slot 122 the stop lug 62 is moved out of engagement with the tripping finger 127, thus releasing the cat 119 and the pin 128, acting on the arm 121, quickly returns the same to its original position in respect to the turntable 48, thus causing the cat 119 to jump into a position as shown in Fig. 6, just before the dog reaches the same and enters the housing 36 through the door opening 41, as shown in Fig. 7. After the cat 119 has jumped away from the dog 129 the cam channel 134, acting on the cam stud 133, returns said dog to the housing 36 through the door opening 42, as shown in Fig. 3. After the stop lug 62 has released the cat 119 said stop lug is positioned in the path of movement of the stop shoulder 64 on the turntable 48 and stops said turntable at the completion of a complete rotation with the cat 119 and dog 129 repositioned in their original positions in front of the door openings 40 and 42, respectively.

After the coin has been released from the coin chute 89 the same drops through the coin slot 115 and is deposited in the coin box 111. The purpose of making the coin box 111 detachable from the casing 35 is to permit said box, when filled with coins, to be detached from said casing and taken to a bank for the contents to be deposited, thus making it unnecessary to carry the entire device.

The purpose of the lip 90 is to prevent a long thin instrument such as a knife blade from being inserted through the coin slot 39 and coin chute 89 to connect the upper and lower slides 76 and 77 to lock the mechanism so that the toy may be operated without depositing the coin in the bank. By requiring a coin to complete the action of the mechanism it is an incentive to a child to save so that he can manipulate the toy.

What I claim is:

1. In a device of the class described, a movable figure, propelling means for the figure, and mechanism for temporarily interrupting the movement of the figure and then move the same at an increased speed to compensate for the interrupted movement thereof.

2. The structure defined in claim 1 in which the figure is capable of movement from a natural to an unnatural position and in which the mechanism is adapted to move the figure into its unnatural position during the interrupted movement thereof.

3. The structure defined in claim 1 in which the figure is flexible and capable of movement from a natural to an unnatural position and yieldingly held in its natural position and in which the mechanism is adapted to move the figure into its unnatural position during the interrupted movement thereof.

4. In a device of the class described, a travelling member, a figure movably mounted in respect to the travelling member, main propelling means for the travelling member, secondary propelling means normally causing the figure to move with the travelling member, and means for temporarily interrupting the movement of the figure in respect to the travelling member and then release the same to the secondary propelling means, said figure when released to the secondary propelling means being returned thereby to normal position in respect to the traveling member and at an increased speed over that of the traveling member to compensate for the interrupted movement thereof.

5. In a device of the class described, a rotatable member, a figure movably mounted in respect to the rotatable member, main propelling means for the rotatable member, secondary propelling means normally causing the figure to move with the rotatable member, means for temporarily interrupting the movement of the figure in respect to the rotatable member and then release the same to the secondary propelling means to be returned thereby at an increased speed to normal position in respect to the rotatable member.

6. In a device of the class described, a rotatable member, a figure movably mounted in respect to the rotatable member, propelling means for the rotatable member, yielding means normally causing the figure to move with the rotatable member, and stop means for temporarily interrupting the movement of the figure in respect to the rotatable member and then release the same to said yielding means to be returned thereby to normal position in respect to the rotatable member.

7. The structure defined in claim 6 in which the yielding means is set under strain by the rotatable member during the interrupted movement of the figure.

8. In a device of the class described, a rotatable member, a figure movably mounted on the rotatable member, propelling means for the rotatable member, a spring normally holding the figure in a predetermined position on the rotatable member for movement therewith, and stop means for temporarily interrupting the movement of the figure with the rotatable member, said figure being arranged to move past the stop means during its interrupted movement and be returned to normal position on the rotatable member by the spring.

9. The structure defined in claim 8 in which the spring is arranged to be placed under tension by the rotatable member during the interrupted movement of the figure.

10. In a device of the class described a rotatable member, propelling means for the rotatable member, a carrier mounted on the rotatable member for a limited circumferential movement in respect thereto, yielding means normally holding the carrier in a predetermined position on the rotatable member, a figure pivoted to the carrier for movement from a natural to an unnatural position, and a stop member arranged to be engaged by a part on the figure to retard the movement of the carrier and to permit the rotatable member to move in respect thereto, said figure being arranged to be moved into an unnatural position by its engagement with the stop means and out of engagement with the stop member and returned to normal position on the rotatable member by said yielding means.

11. The structure defined in claim 1 in which the figure is mounted for movement from a natural to an unnatural position and yieldingly held in a natural position, and in further combination with a stop member arranged to be engaged by a part on the figure for retarding the movement of the figure and moving the same into an unnatural position, said figure when in its unnatural position being arranged to move out of engagement with the stop member.

12. The structure defined in claim 6 in further combination with a movably mounted second figure, said rotatable member having means for moving the second figure toward the first noted figure and then returning said second figure to normal position once during each cycle of the rotatable member.

13. The structure defined in claim 10 in further combination with a second figure movably mounted in respect to the rotatable member, said rotatable member having means for moving the second figure toward the first noted figure in timed relation with the retarding movement of said first noted figure and then returning said second figure to normal position.

14. The structure defined in claim 1 in further combination with a second movable figure, and in which said mechanism is arranged to impart a movement to the second figure in which it approaches the first noted figure prior to its interrupted movement and thereafter impart a receding movement to said figure.

In testimony whereof I affix my signature.

INGVALD J. A. HAGEMO.